United States Patent
Tao et al.

(10) Patent No.: US 9,923,358 B2
(45) Date of Patent: Mar. 20, 2018

(54) USB ADAPTER PROTECTION

(71) Applicant: Fairchild Semiconductor Corporation, San Jose, CA (US)

(72) Inventors: Zhibo Tao, San Jose, CA (US); David Kunst, Cupertino, CA (US); Won-Seok Kang, Bucheon (KR); Ke Hong, Cupertino, CA (US)

(73) Assignee: Fairchild Semiconductor Corporation, San Jose, CA (US)

( * ) Notice: Subject to any disclaimer, the term of this patent is extended or adjusted under 35 U.S.C. 154(b) by 344 days.

(21) Appl. No.: 14/619,659

(22) Filed: Feb. 11, 2015

(65) Prior Publication Data

US 2015/0229119 A1    Aug. 13, 2015

Related U.S. Application Data

(60) Provisional application No. 61/938,530, filed on Feb. 11, 2014.

(51) Int. Cl.

| | |
|---|---|
| *H02H 3/20* | (2006.01) |
| *H02H 9/04* | (2006.01) |
| *H02H 1/00* | (2006.01) |
| *H02H 3/16* | (2006.01) |

(52) U.S. Cl.
CPC ............ *H02H 1/0007* (2013.01); *H02H 3/16* (2013.01)

(58) Field of Classification Search
CPC ............. H02H 3/20; H02H 9/04; H02H 9/041
USPC ........................................................ 361/91.1
See application file for complete search history.

(56) References Cited

U.S. PATENT DOCUMENTS

| | | | |
|---|---|---|---|
| 2013/0335865 A1 | 12/2013 | Kim | |
| 2014/0013012 A1* | 1/2014 | Terlizzi | ................... G06F 13/38 710/15 |

* cited by examiner

*Primary Examiner* — Dharti Patel
(74) *Attorney, Agent, or Firm* — Brake Hughes Bellermann LLP

(57) ABSTRACT

This document discusses, among other things, a protection system and method configured to detect a parasitic impedance between first and second pins of a standard connector and to remove a current path between a power source and a supply pin of the standard connector if a low-impedance is detected, in certain examples, without adding a current sense resistance to a return path between a ground pin of the standard connector and the power source.

21 Claims, 8 Drawing Sheets

USB ADAPTER PROTECTION

CLAIM OF PRIORITY

This application claims the benefit of priority under 35 U.S.C. § 119(e) of U.S. Provisional Patent Application Ser. No. 61/938,530, titled "USB ADAPTER PROTECTION," filed on Feb. 11, 2014, which is incorporated by reference herein in its entirety.

BACKGROUND

Many electronic devices are configured for use with standardized cables and connectors, such as to charge the electronic device, transfer data, connect one or more accessory devices, etc. Under certain conditions, if the power through these cables or connectors becomes too high, the cables, connectors, or coupled devices can be damaged, even melting or catching fire.

OVERVIEW

This document discusses, among other things, a protection system and method configured to detect a parasitic impedance between first and second pins of a standard connector and to remove a current path between a power source and a supply pin of the standard connector if an abnormally low-impedance is detected, in certain examples, without adding a current sense resistance to a return path between a ground pin of the standard connector and the power source.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, a system and method configured to protect electronic devices and electrical adapters during low-impedance situations. In certain examples, the system can include a direct current (DC) breaker (e.g., a switch) coupled to an electrical adapter or electronic device, and the method can include opening or restricting a current path when an abnormally low connector impedance is detected.

Electrical adapters, such as universal serial bus (USB) cables or connectors, can become damaged or dirty, or can grow metal whiskers or metallic dendrites, causing abnormally low impedance between connector pins, such as between a voltage bus (VBUS) and a ground connection (GND) or one or more other connector pins.

Figure 1:
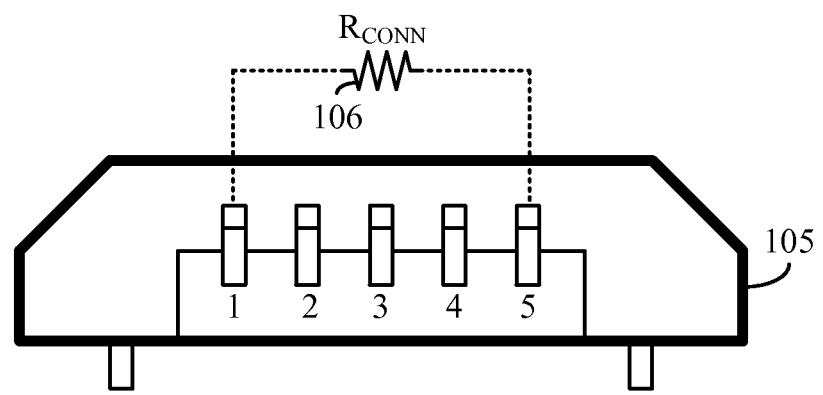
FIG. 1 illustrates generally an example prior art micro-USB connector.

FIG. 1 illustrates generally an example prior art micro-USB connector 105. In an example, the pin configuration can include, for pins 1-5 (right to left): (1) VBUS; (2) data minus (D−); (3) data plus (D+); (4) ID; and (5) GND. Under certain conditions, such as when connected to a travel adapter, low USB cable, connector, or pin-to-pin impedance can result in excessive power loss, which can produce heat, causing melting or fire. In this example, connector impedance ($R_{CONN}$) 106 is illustrated between pins VBUS and GND.

Table 1 illustrates example measured thermal-camera temperature test results of a resistor added between the VBUS and GND pins of a micro-USB connector and the micro-USB connector itself. The thermal camera has a maximum measurable temperature of 360° C. For the third and fourth Test Conditions in Table 1, the added resistor temperatures reached the maximum measurable temperature, meaning the real temperature for these Test Conditions will be higher than 360° C.

TABLE 1

| Test Condition (VBUS Voltage (V); Resistance Value (Ω); Resistor Current (mA)) | Power Loss (W) | Resistor Temperature (° C.); Burn-in Time | Micro-USB Temperature (° C.); Burn-in Time |
| --- | --- | --- | --- |
| (1) 5 V; 50 Ω; 96 mA | 0.5 W | 200.2° C.; 2 Hr | 84.6° C.; 2 Hr |
| (2) 9 V; 91 Ω; 98 mA | 1.0 W | 341.0° C.; 2 Hr | 145.0° C.; 2 Hr |
| (3) 9 V; 62 Ω; 136 mA | 1.3 W | >360.0° C.*; 6 Min | 154.0° C.; 6 Min |
| (4) 9 V; 50 Ω; 167 mA | 1.6 W | >360.0° C.*; 4 Min | 162.6° C.; 4 Min |

Figure 2:
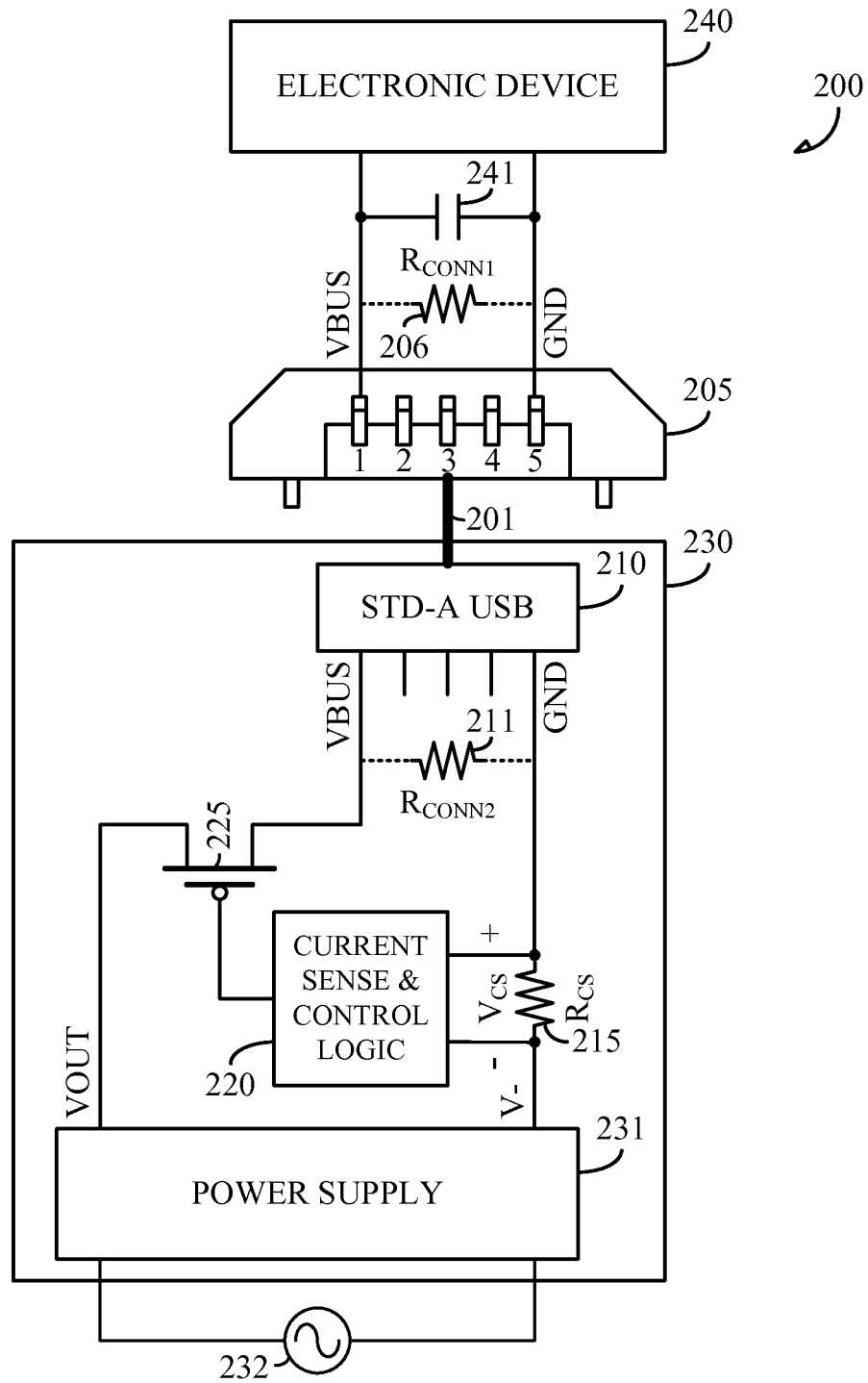
FIG. 2 illustrates generally an existing protection solution.

FIG. 2 illustrates generally an existing protection solution 200 including a USB cable 201, a micro-USB connector 205, and a standard-A (STD-A) USB connector 210, a travel adapter 230, a power supply 231, an AC source 232, and an electronic device 240 having an input capacitance 241. The protection solution 200 is configured to sense a micro-USB or USB connector impedance using a current sense resistor ($R_{CS}$) 215 in the return path between the USB connector 210 and the power supply 231. The micro-USB and USB connector impedance is illustrated between VBUS and GND as micro-USB connector impedance ($R_{CONN1}$) 206 and USB connector impedance ($R_{CONN2}$) 211, respectively. If the voltage drop ($V_{CS}$) across the current sense resistor 215 exceeds a certain threshold, the impedance of at least one of the USB cable 201, micro-USB connector 205, or USB connector 210 is considered to be abnormally low, and a PMOS switch 225 is opened to cut off the current path between VOUT and VBUS to protect the USB cable 201, the micro-USB connector 205, the USB connector 210, or the electronic device 240. However, for such solution to minimize power consumption and efficiency loss, the current sense resistor 215 must be very small, which requires the current sense and control logic 220 to be complex and highly noise sensitive.

In contrast, the present inventors have recognized, among other things, a resistor-less and highly efficient sensing system and method that requires a simple, low-cost detection circuit, suitable for a wide range of electronic device protection, including both present smart phones and prior legacy phones USB connector protection, as well as other connector protection. In an example, resistor-less refers to the lack of a current sense resistor in the system return path (e.g., between a USB connector and a power supply, etc.). In other examples, resistor-less can refer to the lack of any added resistor or resistance in the current sense or the control logic.

Figure 3:
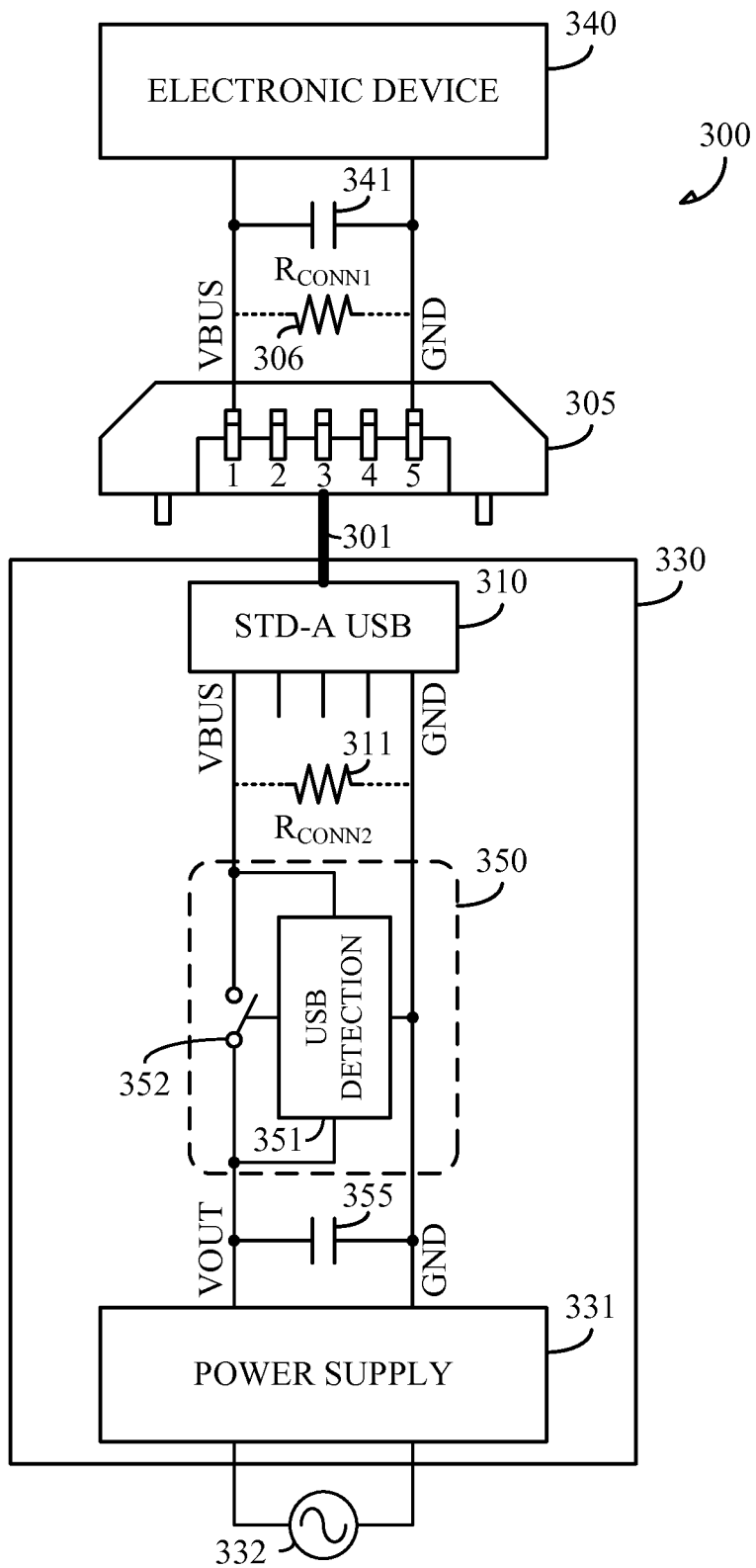
FIGS. 3-6 illustrate generally example protection systems.

FIG. 3 illustrates generally an example protection system 300 including a USB cable 301, a micro-USB connector 305, a USB connector 310, a USB protection circuit 350, a travel adapter 330, a power supply 331 and associated output capacitor 355, an AC source 232, and an electronic device 340 and associated input capacitance 341. The electronic device 340 can include a mobile device, such as a smart phone. The travel adapter 330 is configured to receive AC power from the AC source 232, and the power supply 331 is configured to provide a DC output (VOUT). In certain examples, the travel adapter 330 can be replaced with one or more other chargers or electronic devices. Further, in other examples, the USB protection circuits described herein can be compatible with one or more other types of cables or connectors different than those disclosed herein. For example, the micro-USB connector 305 can include one or more other type of USB or other standard connector (e.g., high-definition multimedia interface (HDMI), displayport, thunderbolt, firewire, etc.).

In an example, the USB protection circuit 350 can be configured to detect a pin-to-pin impedance of one or both of the micro-USB or USB connectors 305, 310, such as, for example, between one or more of VBUS-to-GND, VBUS-to-D+, or VBUS-to-D- on a micro-USB or USB connector 305, 310, and to remove a current path between VOUT and VBUS if an abnormally low impedance is detected. In FIG. 3, representations of pin-to-pin impedances (e.g., parasitic impedances) of the micro-USB and USB connectors 305, 310 between VBUS and GND are illustrated as micro-USB and USB connector impedances ($R_{CONN1}$, $R_{CONN2}$) 306, 311, respectively. The impedances between VBUS and D+ or VBUS and D-, or of the USB cable 301 can be similarly represented.

The USB protection circuit 350 includes a USB detection circuit 351 and a switch 352. The USB detection circuit is configured to detect an impedance across one or more pins of the USB connector 310 or the micro-USB connector 305, or across one or more conductors of the USB cable 301, and to control the switch 352. The switch 352 is configured to act as a DC breaker between VOUT of the power supply 331 and VBUS of the USB connector 310, and can include one or more electronic devices configured to act as a DC breaker (e.g., one or more transistors, a relay, etc.).

In contrast to the example illustrated in FIG. 2, the USB protection circuit 350 does not require additional current sense resistors, which would add cost to and lower the efficiency of a detection circuit 351. Further, as the USB protection circuit 350 does not otherwise interfere with the connection between the power supply 331 and the USB connector 310, it is compatible with both current smart phones (e.g., able to send/receive data or commands using the standard connector, etc.) and legacy phones (e.g., able to only charge using the standard connector, etc.), as well as other electronic devices using USB, micro-USB, or other connection/charging standards.

Figure 4:
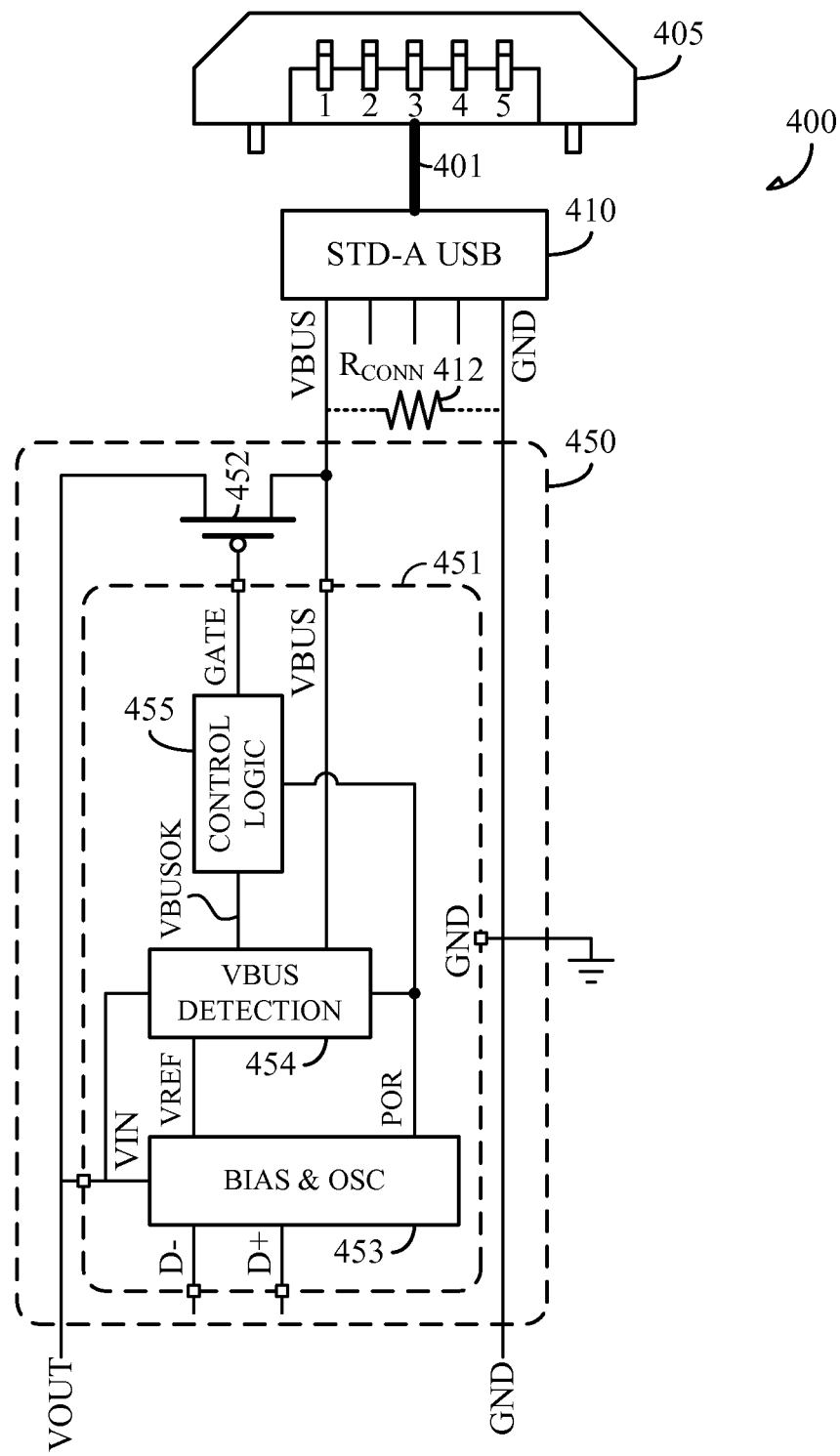

FIG. 4 illustrates generally an example protection system 400 including a USB cable 401, a micro-USB connector 405, a USB connector 410, and a USB protection circuit 450. In this example, the pin-to-pin impedance of the USB and micro-USB connectors 405, 410 are represented as a connector impedance ($R_{CONN}$) 412. In an example, the USB protection circuit 450 includes a switch 452 (e.g., a PMOS transistor) and a USB detection circuit 451. The USB detection circuit 451 includes a bias and oscillator circuit 453, a VBUS detection circuit 454, and a control logic circuit 455. The USB detection circuit 451 can sense VBUS-to-GND impedance and control the impedance state of the switch 452 (e.g., a high-impedance state (OFF), a low-impedance state (ON)) using a GATE signal.

In an example, if the VBUS detection circuit 454 detects that the VBUS-to-GND impedance is above a certain threshold, indicating a normal connection, the control logic circuit 455 can drive a GATE signal low, turning the switch 452 (e.g., a PMOS switch) ON to connect the USB cable 401 to an output voltage from a power supply (VOUT). If the VBUS detection circuit 454 detects that the VBUS-to-GND impedance is below a certain threshold, indicating an abnormal connection, the control logic circuit 455 can drive the GATE signal high, turning the switch 452 (e.g., a PMOS switch) OFF to disconnect the USB cable from VOUT.

Further, in certain examples, the USB detection circuit 451 can detect if a smart phone or a legacy phone is connected using the D+ or D- pins. If an electronic device is coupled to the USB detection circuit 451, the VBUS-to-GND impedance can be detected one time, typically right after connecting the electronic device to the USB connector 410. If an electronic device is not connected, the VBUS-to-GND impedance can be detected periodically to prevent dirt, water, corrosion, metal whiskers, metallic dendrites, or one or more other induced impedance drops or short circuits while the USB connector 410 is idle.

Figure 5:
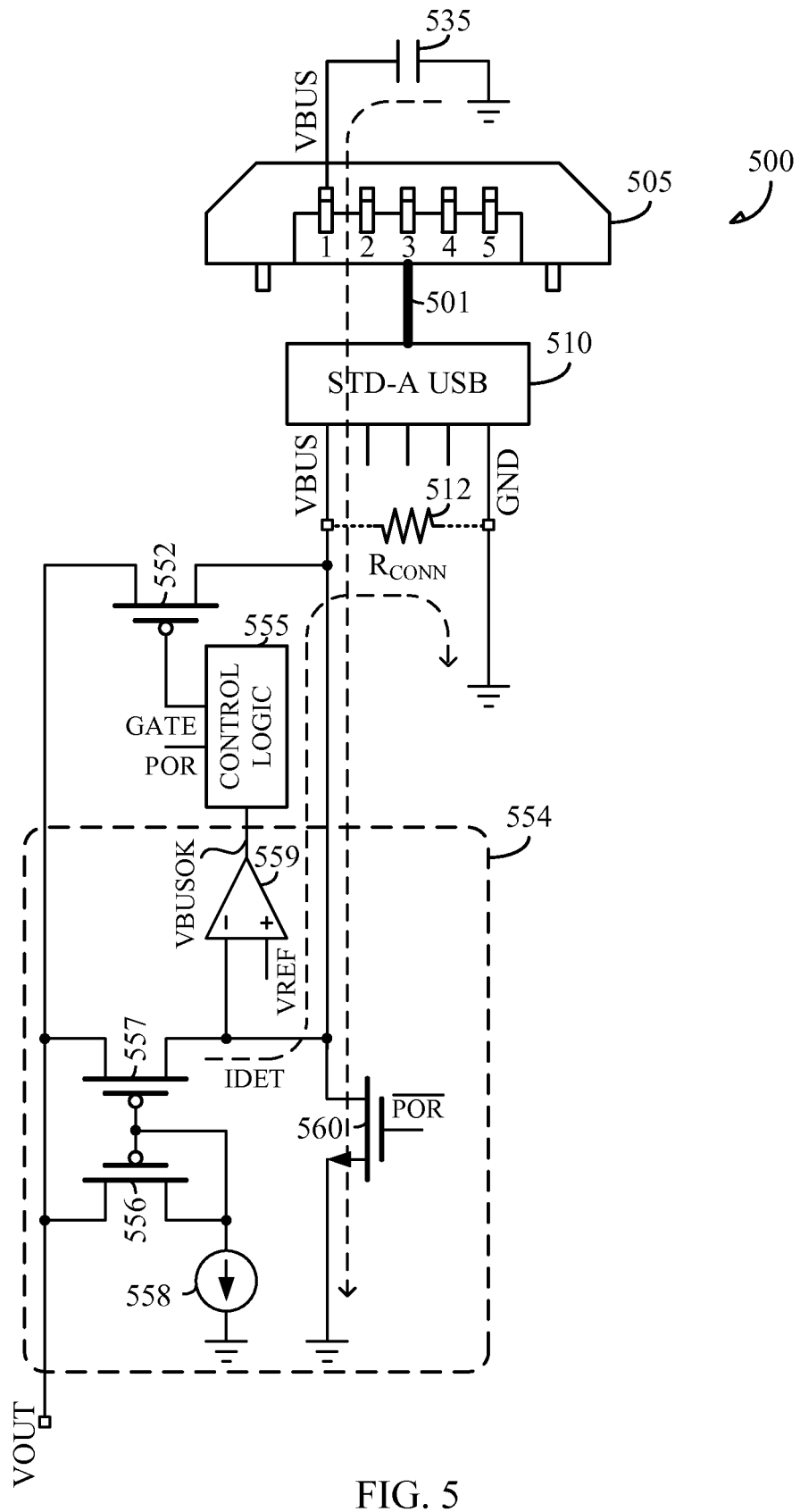

FIG. 5 illustrates generally an example protection system 500 including a USB cable 501, a micro-USB connector 505, a USB connector 510, a VBUS capacitor 535, a connector impedance ($R_{CONN}$) 512, a switch 552, a control logic circuit 555, and a VBUS detection circuit 554.

In an example, the VBUS detection circuit 554 includes first and second PMOS transistors 556, 557 and a current source 558 configured to provide a detection current (IDET), a comparator 559, and an NMOS transistor 560. The NMOS transistor 560 can be configured to discharge the VBUS capacitor 535. In an example, the switch 552 (e.g., a PMOS switch) is initially OFF before detection. After a power-on-reset (POR) time period, the NMOS transistor 560 is turned off and the detection current IDET (e.g., a constant current) can be sourced to VBUS using the first and second PMOS transistors 556, 557 and a current source 558.

In certain examples, the detection current can be made programmable either internally by trimming or set by an external resistor. If the connector impedance 512 is detected as an acceptably high impedance, for example, using a comparator 559 and a reference voltage (VREF), the voltage on VBUS (e.g., $IDET*R_{CONN}$) will be higher than VREF in a specified time period, indicating that the micro-USB and USB connectors 505, 510 are in good condition, and the switch 552 is turned ON. If the connector impedance 512 is detected as an abnormally low impedance, the voltage on VBUS will be less than the reference voltage in a specified time period, indicating that the micro-USB and USB connectors 505, 510 are faulty, and the switch 552 is kept OFF, protecting the USB cable 501 and any electronic device coupled to the USB cable 501. In an example, the abnormally low impedance value can be derived using the values in Table 1. In other examples, other values can be used.

Figure 6:
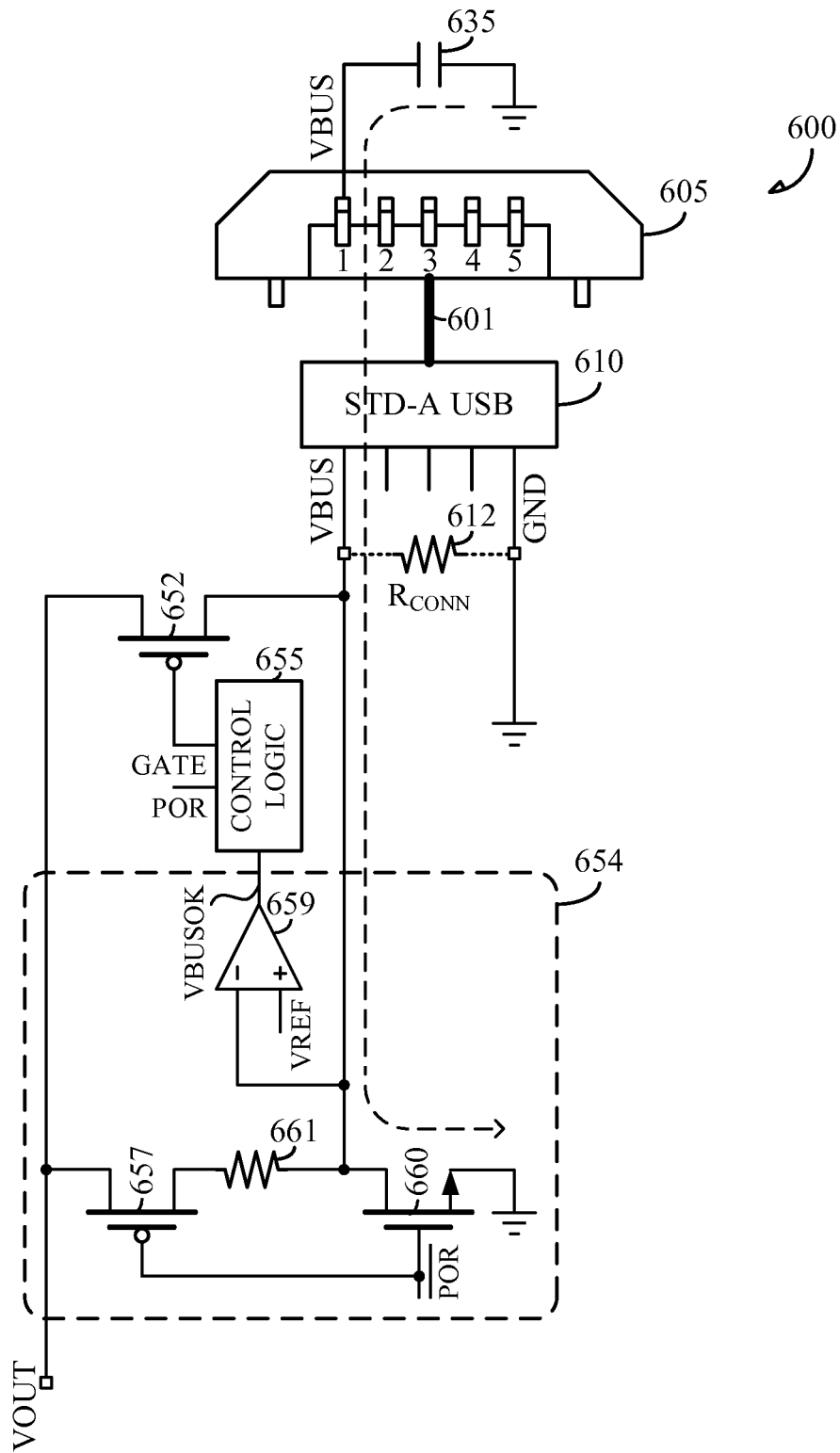

FIG. 6 illustrates generally an example protection system 600 including a USB cable 601, a micro-USB connector 605, a USB connector 610, a VBUS capacitor 635, a connector impedance ($R_{CONN}$) 612, a switch 652, a control logic circuit 655, and a VBUS detection circuit 654.

In an example, the VBUS detection circuit 654 includes a first PMOS transistor 657, an internal resistor 661, a comparator 659, and an NMOS transistor 660. The NMOS transistor 660 can be configured to discharge the VBUS capacitor 635. In an example, the switch 652 (e.g., a PMOS switch) and the first PMOS transistor 657 are initially OFF. After a POR time period, the NMOS transistor 660 the first PMOS transistor 657 is turned ON and the internal resistor 661 and connector impedance 612 form a resistor divider. If the connector impedance 612 is an acceptably high impedance, the voltage on VBUS through the resistor divider will be higher than a reference voltage (VREF) in a specified time period, indicating that the micro-USB and USB connectors 505, 510 are in good condition, and the switch 652 is turned ON. If the connector impedance 612 is an abnormally low impedance, the voltage on VBUS through the resistor divider will be lower than the reference voltage in a specified time period, indicating that the micro-USB and USB connectors 605, 610 are faulty, and the switch is kept OFF.

Figure 7:
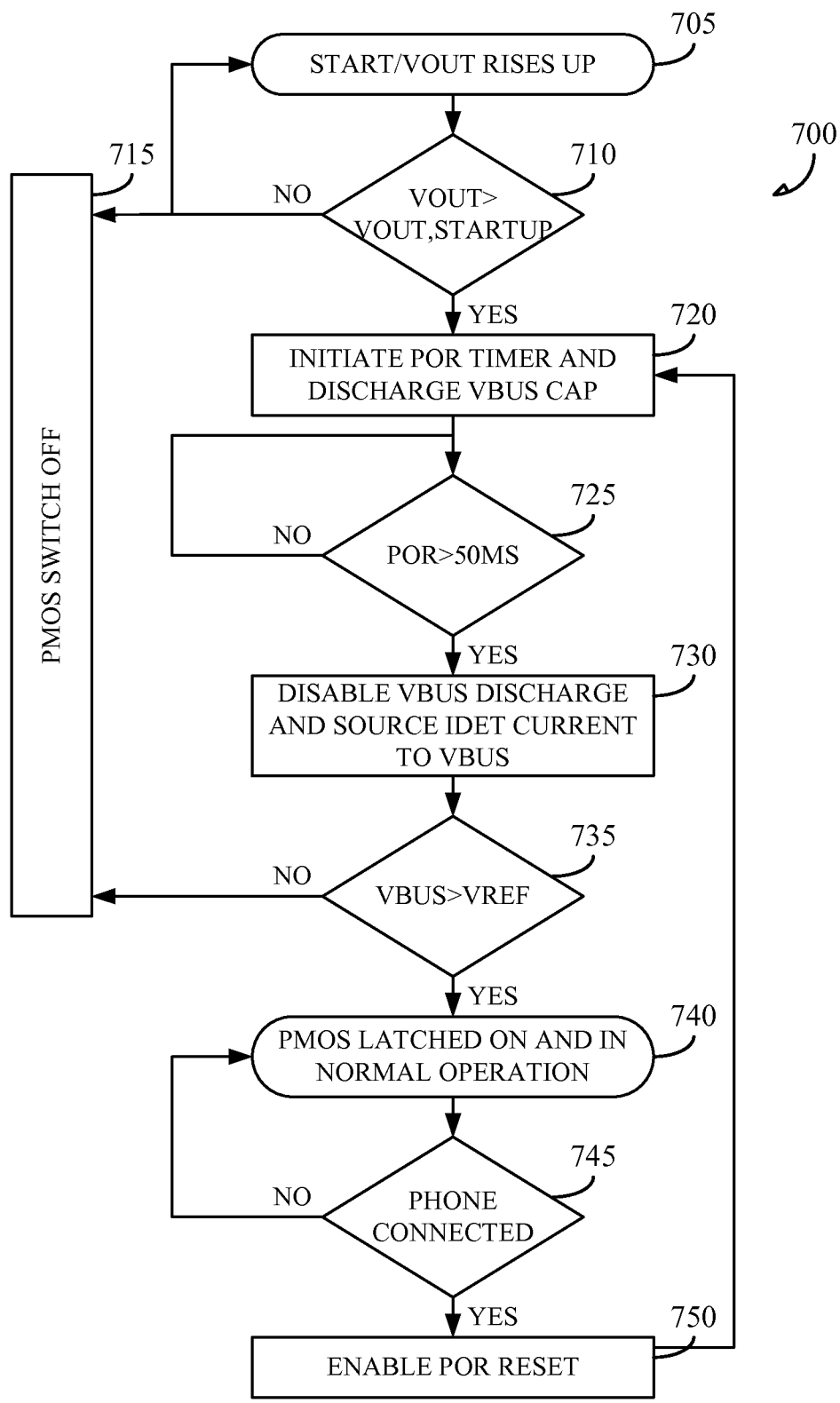
FIG. 7 illustrates generally an example protection flow chart.

FIG. 7 illustrates generally an example protection flow chart 700. At 705, VOUT rises. If, at 710, VOUT is greater than a threshold amount (e.g., VOUT, STARTUP), a POR timer is initiated at 720, and a VBUS capacitor can be discharged. If, at 710, VOUT is less than the threshold, the switch (e.g., the PMOS switch) is turned or kept off at 715. In an example, at 720, a VBUS capacitor can be discharged. If, at 725, the POR timer is greater than a first period (e.g., 50 ms), VBUS discharge is disabled and a detection current (IDET) is sourced to VBUS at 730. If, at 725, the POR timer is less than the first period, the switch is turned or kept off at 715. If, at 735, the voltage on VBUS is greater than a reference voltage VREF, the switch is latched on and is in normal operation at 740. If, at 735, the voltage on VBUS is less than the reference voltage, the switch is turned or kept off at 715.

At 745, if an electronic device (e.g., a smart phone, etc.) is connected, POR reset is enabled at 750, and process flow returns to 720. If, at 745, an electronic device is not connected, process flow returns to 740.

Figure 8:
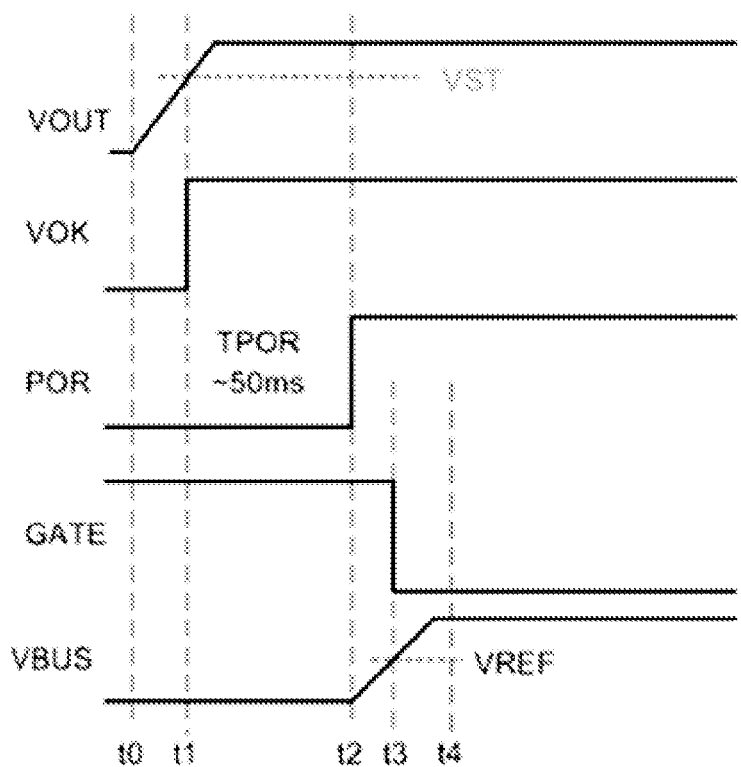
FIGS. 8-9 illustrate generally example waveforms of acceptably high and low USB connector VBUS-to-GND impedance, respectively.

FIG. 8 illustrates generally example waveforms of acceptably high USB connector VBUS-to-GND impedance. At t0, the travel adapter is plugged into an alternating current (AC) source and VOUT starts to rise up. At t1, VOUT approaches a startup threshold (VST), and the indicate signal VOK becomes high. At t2, the POR time period ends (e.g., ~50 ms). At t3, VBUS is charged up to a reference voltage VREF in a specified time, and GATE becomes low and PMOS switch is turned ON. At t4, the specified detection time period ends.

Figure 9:
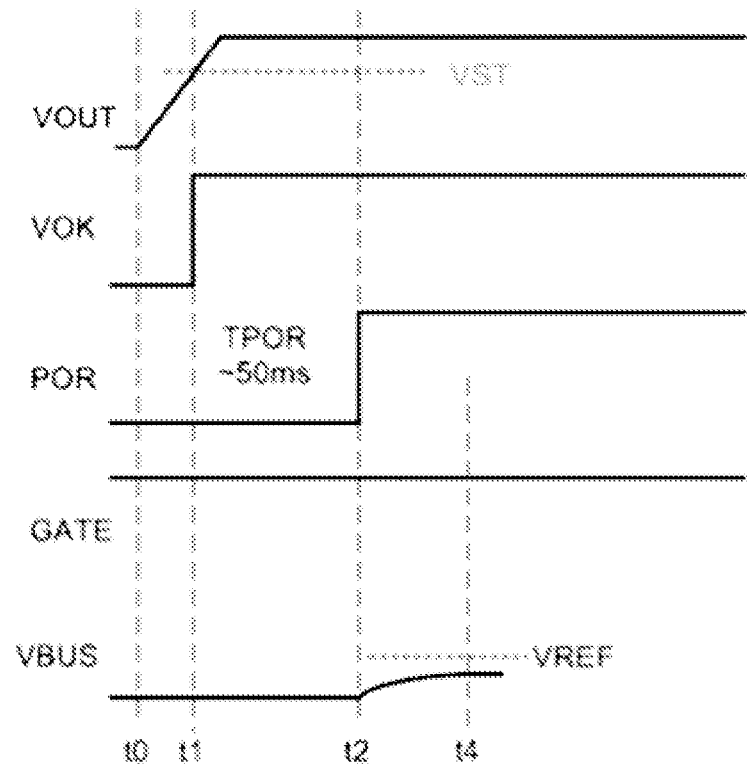

FIG. 9 illustrates generally example waveforms of abnormally low USB connector VBUS-to-GND impedance. At t0, the travel adapter is plugged into an AC source and VOUT starts to rise up. At t1, VOUT approaches a startup threshold (VST), and the indicate signal VOK becomes high. At t2, the POR time period ends (e.g., ~50 ms). At t4, the specified detection time period ends, and because VBUS did not approach a reference voltage VREF during this time period, GATE is kept high and PMOS switch is kept OFF.

Additional Notes and Examples

In Example 1, a protection circuit includes a switch configured to provide a current path between a power source and a supply pin of a standard connector in a first state and to remove a current path between the power source and the supply pin of the standard connector in a second state, and a detection circuit configured to detect a voltage across a parasitic impedance between first and second pins of the standard connector and to control the switch using the detected voltage.

In Example 2, the detection circuit of Example 1 optionally is optionally configured to compare the voltage across the parasitic impedance between the first and second pins of the standard connector to a reference and to control the switch using the comparison.

In Example 3, the detection circuit of any one or more of Examples 1-2 is optionally configured to detect the voltage across the parasitic impedance between the first and second pins of the standard connector without adding a current sense resistance to a return path between a ground pin of the standard connector and the power source.

In Example 4, the switch of any one or more of Examples 1-3 optionally includes: a first terminal coupled to the power source; a second terminal coupled to the supply pin of the standard connector; and a control terminal coupled to the detection circuit, wherein the first state includes a low-impedance state between the first and second terminals and the second state includes a high-impedance state between the first and second terminals.

In Example 5, the switch of any one or more of Examples 1-4 optionally includes a first transistor, wherein the control terminal of the switch of any one or more of Examples 1-4 optionally includes a gate of the first transistor, and wherein the detection circuit of any one or more of Examples 1-4 optionally includes control logic configured to drive the gate of the transistor.

In Example 6, the power source of any one or more of Examples 1-5 optionally includes a travel adapter including a supply configured to provide power to the standard connector through the switch and a ground connection configured to provide a return path.

In Example 7, the supply pin of the standard connector of any one or more of Examples 1-6 optionally includes a voltage bus (VBUS) pin of a universal serial bus (USB) connector.

In Example 8, the first pin of any one or more of Examples 1-7 optionally includes one of a VBUS pin, a data plus (D+) pin, or a data minus (D−) pin of the USB connector, and the second pin includes a ground (GND) pin of the USB connector.

In Example 9, the first and second pins of any one or more of Examples 1-8 optionally include two pins from a group consisting of a VBUS pin, a data plus (D+) pin, a data minus (D−) pin, or a ground (GND) pin of the USB connector.

In Example 10, the detection circuit of any one or more of Examples 1-9 optionally includes: a second transistor having a first terminal, a second terminal, and a control terminal, the first terminal of the second transistor coupled to the power source; and a resistor having a first terminal coupled to the second terminal of the second transistor and a second terminal coupled to the supply pin of the standard connector, the resistor configured to form a voltage divider with the parasitic impedance of the standard connector, wherein the detection circuit is configured to compare the voltage on the second terminal of the resistor to a reference and to control the switch using the comparison.

In Example 11, the detection circuit of any one or more of Examples 1-10 optionally includes a current source configured to provide a current across the parasitic impedance between the first and second pins of the standard connector, wherein the detection circuit is configured to detect the voltage across the parasitic impedance between the first and second pins of the standard connector in response to the provided current and to control the switch using the detected voltage.

In Example 12, any one or more of Examples 1-11 optionally includes providing a current path between a power source and a supply pin of a standard connector using a switch in a first state; removing a current path between the power source and the supply pin of the standard connector in using the switch in a second state; detecting a voltage across a parasitic impedance between first and second pins of the standard connector using a detection circuit; and controlling the switch using the detected voltage.

In Example 13, any one or more of Examples 1-4 optionally includes comparing the voltage across the parasitic impedance between the first and second pins of the standard connector to a reference, wherein the controlling the switch includes using the comparison.

In Example 14, the detecting a voltage across the parasitic impedance between the first and second pins of the standard connector of any one or more of Examples 1-13 optionally includes detecting the voltage across the parasitic impedance between the first and second pins of the standard connector without adding a current sense resistance to a return path between a ground pin of the standard connector and the power source.

In Example 15, the power source of any one or more of Examples 1-14 optionally includes a travel adapter including a supply configured to provide power to the standard connector through the switch and a ground connection configured to provide a return path.

In Example 16, the supply pin of any one or more of Examples 1-15 optionally includes a voltage bus (VBUS) pin of a universal serial bus (USB) connector.

In Example 17, the detecting the voltage across a parasitic impedance between the first and second pins of the standard connector of any one or more of Examples 1-16 optionally includes detecting a voltage across a parasitic impedance between one of a VBUS pin, a data plus (D+) pin, or a data minus (D−) pin of the USB connector and a ground (GND) pin of the USB connector.

In Example 18, the detecting a voltage across a parasitic impedance of the standard connector of any one or more of Examples 1-17 optionally includes: dividing a voltage between a resistor and the parasitic impedance of the standard connector while the switch is in the second state, wherein the resistor is coupled between a second transistor and the supply pin of the standard connector; and comparing the voltage at the supply pin of the standard connector to a reference, wherein the controlling the switch includes using the comparison.

In Example 19, the detecting a voltage across a parasitic impedance of the standard connector of any one or more of Examples 1-17 optionally includes: providing a current across the parasitic impedance between the first and second pins of the standard connector using a current source; and detecting a voltage across the parasitic impedance between the first and second pins of the standard connector in response to the provided current.

In Example 20, any one or more of Examples 1-19 optionally includes: a power source including a supply and a ground connection; a standard connector including a supply pin and a ground pin; a switch configured to provide a current path between the supply of the power source and the supply pin of the standard connector in a first state and to remove a current path between the supply of the power source and the supply pin of the standard connector in a second state; and a detection circuit configured to detect a voltage across a parasitic impedance between first and second pins of the standard connector and to control the switch using the detected voltage.

In Example 21, the detection circuit of any one or more of Examples 1-20 is optionally configured to detect the voltage across the parasitic impedance between the first and second pins of the standard connector without adding a current sense resistance to a return path between the ground pin of the standard connector and the ground connection of the power source, the supply pin of the standard connector of any one or more of Examples 1-20 optionally includes a voltage bus (VBUS) pin of a universal serial bus (USB) connector, and the first pin of any one or more of Examples 1-20 optionally includes one of a VBUS pin, a data plus (D+) pin, or a data minus (D−) pin of the USB connector, and the second pin includes a ground (GND) pin of the USB connector.

In Example 22, a system or apparatus can include, or can optionally be combined with any portion or combination of any portions of any one or more of Examples 1-21 to include, means for performing any one or more of the functions of Examples 1-21, or a machine-readable medium including instructions that, when performed by a machine, cause the machine to perform any one or more of the functions of Examples 1-21.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A protection circuit, comprising:
    a first switch configured to provide a current path between a power source and a supply pin of a standard connector in a first state and to remove the current path between the power source and the supply pin of the standard connector in a second state; and
    a detection circuit configured to detect a parasitic impedance based on a voltage drop between first and second pins of the standard connector and to control the first switch using the detected voltage, the detection circuit including a second switch in parallel with the first switch.

2. The protection circuit of claim 1, wherein the detection circuit is configured to compare the voltage drop between the first and second pins of the standard connector to a reference and to control the first switch using the comparison.

3. The protection circuit of claim 1, wherein the detection circuit is configured to detect the voltage drop between the first and second pins of the standard connector without adding a current sense resistance to a return path between a ground pin of the standard connector and the power source.

4. The protection circuit of claim 1, wherein the first switch includes:
    a first terminal coupled to the power source;
    a second terminal coupled to the supply pin of the standard connector; and
    a control terminal coupled to the detection circuit,
    wherein the first state includes a low-impedance state between the first and second terminals and the second state includes a high-impedance state between the first and second terminals.

5. The protection circuit of claim 4, wherein the first switch includes a first transistor, wherein the control terminal of the first switch includes a gate of the first transistor, and wherein the detection circuit includes control logic configured to drive the gate of the transistor.

6. The protection circuit of claim 1, wherein the power source includes a travel adapter including a supply configured to provide power to the standard connector through the first switch and a ground connection configured to provide a return path.

7. The protection circuit of claim 1, wherein the supply pin of the standard connector includes a voltage bus (VBUS) pin of a universal serial bus (USB) connector.

8. The protection circuit of claim 7, wherein the first pin includes one of a VBUS pin, a data plus (D+) pin, or a data minus (D−) pin of the USB connector, and the second pin includes a ground (GND) pin of the USB connector.

9. The protection circuit of claim 1, wherein the second switch has a first terminal, a second terminal, and a control terminal, the first terminal of the second switch being coupled to the power source; and
    the detection circuit including:
    a resistor having a first terminal coupled to the second terminal of the second switch and a second terminal coupled to the supply pin of the standard connector, the resistor configured to form a voltage divider with the parasitic impedance between the first and second pins of the standard connector, the detection circuit is configured to compare the voltage on the second terminal of the resistor to a reference and to control the first switch using the comparison.

10. The protection circuit of claim 1, wherein the detection circuit includes:

a current source configured to provide a current between the first and second pins of the standard connector, the detection circuit is configured to detect the voltage between the first and second pins of the standard connector in response to the provided current and to control the first switch using the detected voltage.

11. A protection method, comprising:

providing a current path between a power source and a supply pin of a standard connector using a first switch in a first state;

removing the current path between the power source and the supply pin of the standard connector using the first switch in a second state;

detecting a parasitic impedance based on a voltage drop between first and second pins of the standard connector using a detection circuit, the detection circuit including a second switch in parallel with the first switch; and controlling the switch using the detected voltage.

12. The protection method of claim 11, including:

comparing the voltage drop between the first and second pins of the standard connector to a reference, the controlling the first switch includes using the comparison.

13. The protection method of claim 11, wherein the detecting a voltage drop between the first and second pins of the standard connector includes detecting the voltage drop without adding a current sense resistance to a return path between a ground pin of the standard connector and the power source.

14. The protection method of claim 11, wherein the power source includes a travel adapter including a supply configured to provide power to the standard connector through the first switch and a ground connection configured to provide a return path.

15. The protection method of claim 11, wherein the supply pin includes a voltage bus (VBUS) pin of a universal serial bus (USB) connector.

16. The protection method of claim 15, wherein the detecting the voltage drop between the first and second pins of the standard connector includes detecting a voltage across a parasitic impedance between one of a VBUS pin, a data plus (D+) pin, or a data minus (D−) pin of the USB connector and a ground (GND) pin of the USB connector.

17. The protection method of claim 11, wherein the detecting a voltage drop between the first and second pins of the standard connector includes:

dividing a voltage between a resistor and the parasitic impedance between the first and second pins of the standard connector while the first switch is in the second state, wherein the resistor is coupled between a second transistor and the supply pin of the standard connector; and comparing the voltage at the supply pin of the standard connector to a reference, the controlling the first switch includes using the comparison.

18. The protection method of claim 11, wherein the detecting a voltage drop between the first and second pins of the standard connector includes:

providing a current across the parasitic impedance between the first and second pins of the standard connector using a current source; and detecting a voltage across the parasitic impedance between the first and second pins of the standard connector in response to the provided current.

19. A protection system, comprising:

a power source including a supply and a ground connection;

a standard connector including a supply pin and a ground pin;

a first switch configured to provide a current path between the supply of the power source and the supply pin of the standard connector in a first state and to remove the current path between the supply of the power source and the supply pin of the standard connector in a second state; and a detection circuit configured to detect a parasitic impedance based on a voltage drop between first and second pins of the standard connector and to control the first switch using the detected voltage, the detection circuit including a second switch in parallel with the first switch.

20. The protection system of claim 19, wherein the detection circuit is configured to detect the voltage drop between the first and second pins of the standard connector without adding a current sense resistance to a return path between the ground pin of the standard connector and the ground connection of the power source, the supply pin of the standard connector includes a voltage bus (VBUS) pin of a universal serial bus (USB) connector, the first pin includes one of a VBUS pin, a data plus (D+) pin, or a data minus (D−) pin of the USB connector, and the second pin includes a ground (GND) pin of the USB connector.

21. The protection circuit of claim 1, wherein the detection circuit further includes a resistor coupled in series with the second switch and in parallel with the first switch, the resistor configured to form a voltage divider with the parasitic impedance between the first and second pins, the detection circuit is configured to compare the voltage at the resistor to a reference and to control the first switch using the comparison.

* * * * *